US012060864B1

(12) United States Patent
Ajala-Inyang et al.

(10) Patent No.: US 12,060,864 B1
(45) Date of Patent: Aug. 13, 2024

(54) VERTICAL AXIS WIND TURBINE ARM-MAST CONNECTION MEMBER

(71) Applicant: Wind Harvest International Inc, Davis, CA (US)

(72) Inventors: Olamide Ajala-Inyang, Brentwood, CA (US); David John Malcolm, Kirkland, WA (US); Antonio Ojeda Monge, El Puerto de Santa Maria (ES); Alin-Ionut Munteanu, Leuven (BE); Omar Garcia, Amarillo, TX (US); Jeff Willis, Omaha, NE (US)

(73) Assignee: Wind Harvest International Inc, Davis, CA (US)

( * ) Notice: Subject to any disclaimer, the term of this patent is extended or adjusted under 35 U.S.C. 154(b) by 0 days.

(21) Appl. No.: 18/328,721

(22) Filed: Jun. 3, 2023

(51) Int. Cl.
*F03D 13/20* (2016.01)
*F03D 3/00* (2006.01)

(52) U.S. Cl.
CPC .............. *F03D 13/20* (2016.05); *F03D 3/005* (2013.01)

(58) Field of Classification Search
CPC ........ F03D 13/20; F03D 3/005; F03D 1/0658; F03D 1/066; Y10T 403/342; Y10T 403/347
See application file for complete search history.

(56) References Cited

U.S. PATENT DOCUMENTS

| 4,334,823 | A | 6/1982 | Sharp | |
|---|---|---|---|---|
| 9,133,823 | B2 * | 9/2015 | Jaw | ......................... F03D 3/067 |
| 2006/0251516 | A1 * | 11/2006 | Sohn | ......................... F03D 13/10 |
| | | | | 416/132 B |
| 2011/0025071 | A1 * | 2/2011 | Cortesi | ................... F03D 3/061 |
| | | | | 290/55 |
| 2011/0042958 | A1 | 2/2011 | Vander Straeten | |

(Continued)

FOREIGN PATENT DOCUMENTS

| CN | 217682080 U | 10/2022 | |
|---|---|---|---|
| EP | 2616670 A1 | 7/2013 | |
| WO | WO-2012003308 A2 * | 1/2012 | ............. F03D 1/025 |

OTHER PUBLICATIONS

Boteco Hinges, Title: Hinges, website link: "https://www.boteco.com/en/products/hinges", retrieved on May 25, 2023, pp. 7.

*Primary Examiner* — Aaron R Eastman
(74) *Attorney, Agent, or Firm* — Briggs Intellectual Property Law; Jeremy A. Briggs

(57) ABSTRACT

A polygonal mast connected to an arm of a vertical axis wind turbine via a hinged connection member is disclosed. The connection member may include an L-shaped bracket having a first portion and a second portion disposed perpendicular to the first portion. The first portion may be attached to a mast exterior surface. The connection member may further include a first plate and a second plate. The first plate may be attached to the second portion and first plate plane may be disposed perpendicular to mast longitudinal axis. The second arm may be attached to an arm distal end and second plate plane may be disposed parallel to arm longitudinal axis. The connection member may additionally include a first pivot connector and a second pivot connector pivotally connecting the first plate and the second plate. The arm distal end may be disposed between the first and second pivot connectors.

19 Claims, 5 Drawing Sheets

(56) References Cited

U.S. PATENT DOCUMENTS

| | | | |
|---|---|---|---|
| 2013/0170949 A1* | 7/2013 | Samuels | F03D 3/061 |
| | | | 415/121.3 |
| 2016/0348651 A1 | 12/2016 | Haar | |
| 2019/0376488 A1 | 12/2019 | Oslin et al. | |
| 2020/0392940 A1* | 12/2020 | Ennis | F03D 3/005 |

* cited by examiner

US 12,060,864 B1

VERTICAL AXIS WIND TURBINE ARM-MAST CONNECTION MEMBER

TECHNICAL FIELD

The present disclosure relates to a vertical axis wind turbine, and more specifically to a connection member configured to flexibly connect a polygonal turbine mast with a turbine arm.

BACKGROUND

Wind turbines use air flow or wind to generate energy. Wind drives rotation of turbine blades, and turbine generators convert blade kinetic energy into electric power. While wind is essential for wind turbine operation, turbulent winds may exert considerable stress on turbine structure and connections between different turbine components. For example, connections between turbine mast and arms may get damaged and fatigued in turbulent weather or wind conditions.

Vertical axis wind turbines may experience more turbulence than horizontal axis wind turbines when the vertical axis wind turbines are disposed in proximity to ground, where wind turbulence may be more pronounced closer to the ground. Therefore, mast-arm connection in a conventional vertical axis wind turbine may be more prone to failure or damage in turbulent wind conditions.

In a conventional vertical axis wind turbine, the mast is rigidly connected with the arms. The arms may be welded to mast exterior surfaces or may be rigidly connected by using fasteners (e.g., bolts). A rigid mast-arm connection may develop bends or fractures at the mast-arm connection point, when the connection experiences centrifugal force and/or gravitational force, and/or loads due to wind turbulence, aerodynamics or rotating frame effects.

Thus, there is a need for a robust mast-arm connection that may efficiently withstand forces or loads experienced by the connection.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
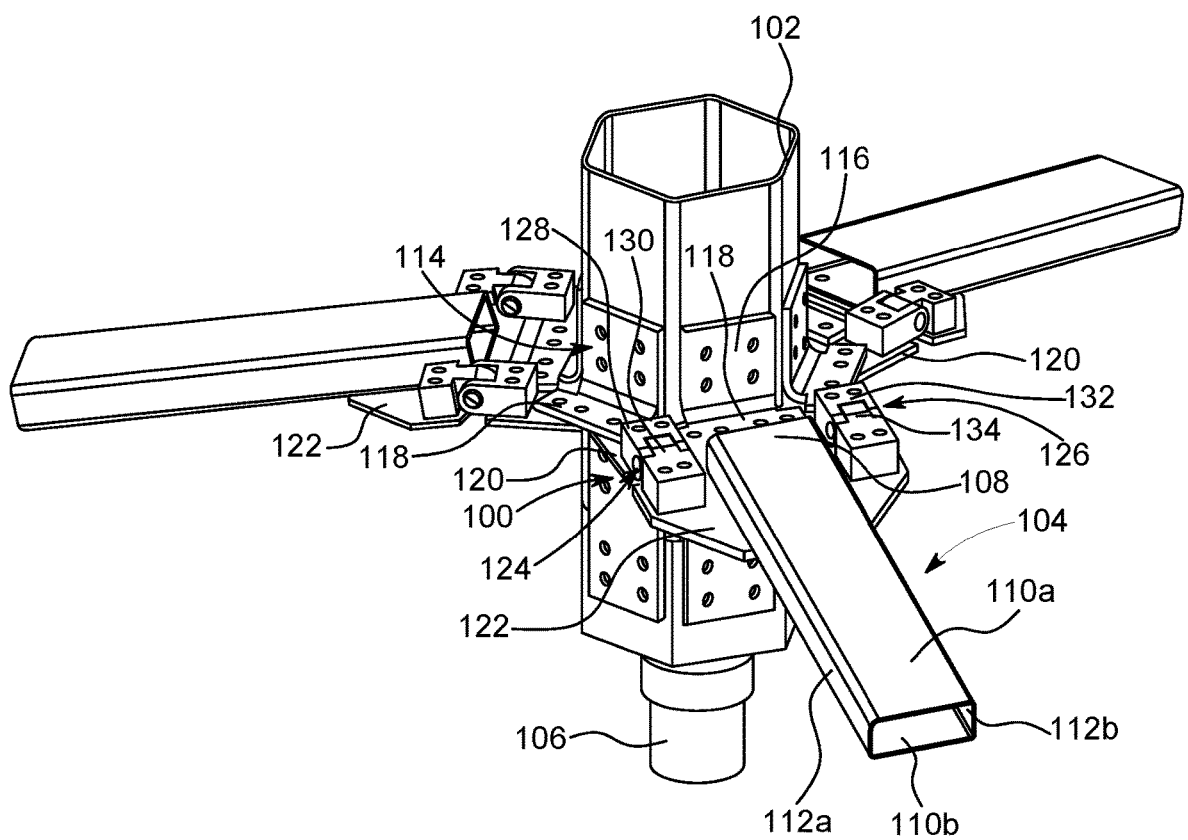
FIG. 1 depicts a top isometric view of an example connection member connecting a mast and an arm in accordance with the present disclosure.

The present disclosure is directed to a connection member configured to connect a polygonal mast with an arm of a vertical axis wind turbine. The mast may be a polygonal mast and the arm may have an elongated rectangular hollow section (or any other sections, such as channels). In an exemplary aspect, the mast may be a hexagonal mast. The connection member may pivotally and flexibly connect the mast with the arm, thereby enabling the mast-arm connection to withstand greater forces and loads than a conventional mast-arm connection. The connection member may include an L-shaped bracket having a first portion and a second portion disposed perpendicular to the first portion. The first portion may be attached to a mast exterior surface. The connection member may further include a first plate and a second plate (e.g., a hinge plate). The second portion of the L-shaped bracket may be attached to the first plate. Further, the first plate may be pivotally connected with the second plate via one or more pivot connectors. The second plate may be further attached to an arm end portion, thereby enabling pivotal connection between the arm end portion and the first plate (and thereby to the mast).

In some aspects, the connection member may include two pivot connectors pivotally connecting the first plate and the second plate. The two pivot connectors may be disposed on opposite sides of the arm end portion. Stated another way, the arm end portion may be disposed between the two pivot connectors. Each pivot connector may include a yoke and a hinge, pivotally connected with each other via a pivotal pin. The yoke may be attached to the first plate and the hinge may be attached to the second plate, thereby enabling pivotal connection between the first plate and the second plate.

The present disclosure discloses a connection member that enables hinged connection between a polygonal mast and a turbine arm. A hinged mast-arm connection ensures that the connection does not develop fractures or bends when the connection experiences loads, e.g., due to gravitation and/or centrifugal force, loads due to wind turbulence, aerodynamics, and/or the like. Specifically, the hinged mast-arm connection is able to support the maximum permissible load (e.g., due to gravitation and/or centrifugal force, loads due to wind turbulence, aerodynamics, and/or the like), including adequate safety factors to ensure the safety of the structural element and/or the integrity of the wind turbine structure. Further, having two pivot connectors connected on either sides of the arm end portion ensures that the loads experienced by the connection member are equally distributed between the two pivot connectors, thus enabling the connection member to withstand greater loads as compared to a conventional mast-arm connection.

These and other advantages of the present disclosure are provided in detail herein.

ILLUSTRATIVE EMBODIMENTS

The disclosure will be described more fully hereinafter with reference to the accompanying drawings, in which example embodiments of the disclosure are shown, and not intended to be limiting.

FIG. 1 depicts a top isometric view of an example connection member 100 connecting a mast 102 and an arm 104 in accordance with the present disclosure. FIG. 1 will be described in conjunction with FIGS. 2, 3, 4 and 5, which depict bottom isometric view, top view, bottom view and side view respectively of the connection member 100.

The mast 102 and the arm 104 may be part of a vertical axis wind turbine. A person ordinarily skilled in the art may appreciate that the vertical axis wind turbine (or wind turbine) may include additional units including, but not limited to, turbine blades (not shown), a drive shaft 106, a power generator (not shown), and/or the like. During turbine operation, winds may exert force on the turbines blades, which may cause the turbine blades to rotate axially relative to a mast longitudinal axis. The turbine blades may be connected to the mast 102 via the arms 104, and may cause the mast 102 to rotate when the turbine blades rotate. A mast bottom end may be attached to a top end of the drive shaft 106, and a driveshaft bottom end may be connected directly or through a gearbox to the power generator that may be configured to generate electric power when the mast 102 rotates. Specifically, the power generator may convert mast kinetic energy into electric energy, thus generating electric power from the vertical axis wind turbine.

The mast 102 may be made of metal such as aluminum, iron, steel, lightweight alloy, and/or the like. The mast 102 may be disposed or aligned perpendicular to ground and may be of any length depending on one or more parameters including, but not limited to, wind turbine dimensions, location of geographical area where the wind turbine may be located, desired electric power output from the wind turbine, and/or the like. Further, the mast 102 may be polygonal in shape having a predefined count of faceted surfaces. For example, in a preferred aspect, the mast 102 may have hexagonal cross-section (or be a hexagonal mast), as depicted in FIGS. 1-4. In other aspects, the mast 102 may have cuboidal, pentagonal, octagonal, etc., cross-sectional shape. Furthermore, in some aspects, the mast 102 may be hollow throughout a mast length. In other aspects, one or more mast interior portions may be hollow, and remaining mast interior portions may be solid.

The drive shaft 106 may be made of metal such as iron, steel, aluminum, a combination thereof, and/or the like. Further, the drive shaft 106 may be of any length depending on the wind turbine dimensions and other factors, e.g., a distance between the drive shaft top end and the power generator, a distance between the mast bottom end and ground, etc. The drive shaft 106 may be a solid cylindrical drive shaft that may be configured to operate with a conventional power generator.

In an exemplary aspect, the wind turbine may include six arms 104 (although three arms 104 are shown in FIGS. 1-4) and three turbine blades. Each turbine blade may be connected to the mast 102 via two arms 104. Each arm 104 may include an arm distal end 108 and an arm proximal end (not shown). The arm proximal end may be connected to the turbine blade and the arm distal end 108 may be flexibly connected with the mast 102 via the connection member 100, as described later in detail below.

Figure 5:
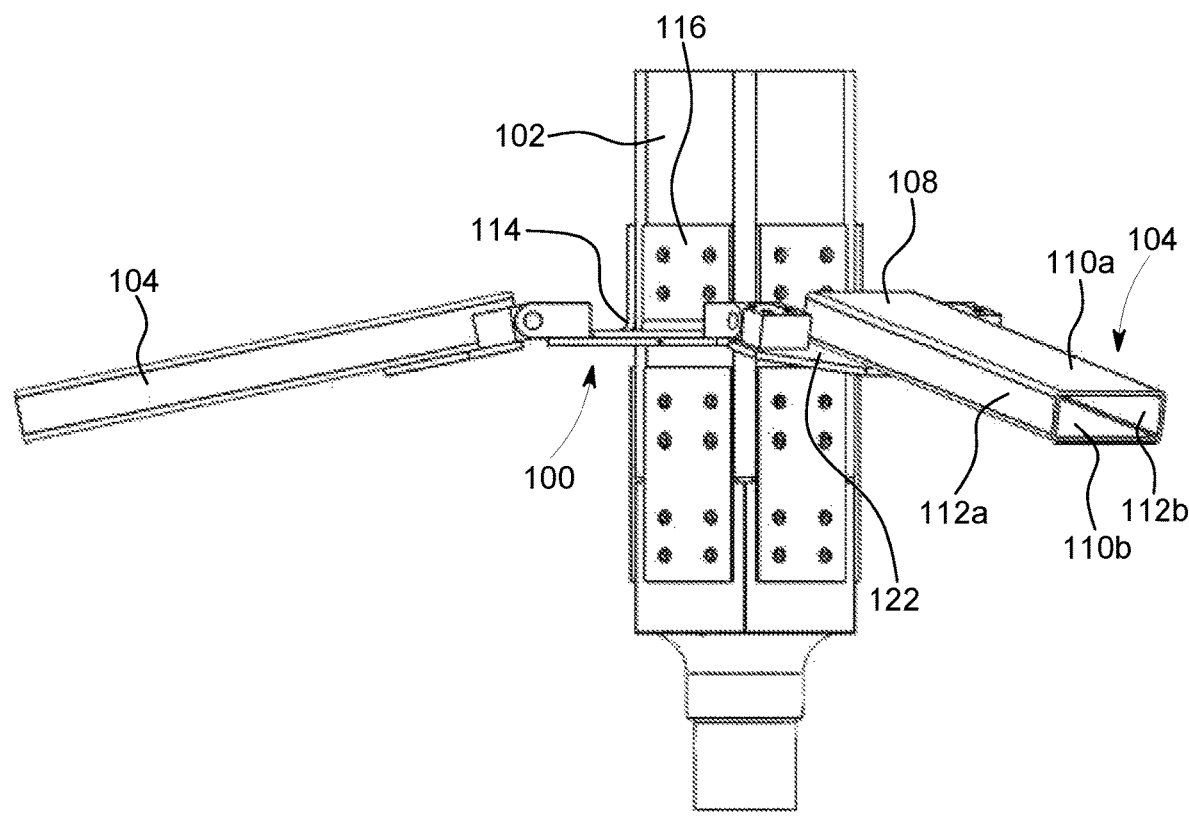
FIG. 5 depicts a side view of the connection member of FIG. 1 in accordance with the present disclosure.

The arm 104 may be made of same or similar material as the mast 102, and may be cuboidal in shape (having rectangular hollow section or any other sections, such as channels). Specifically, the arm 104 may be a hollow elongated cuboid having dimensions (e.g., length and width) that may vary based on the wind turbine dimensions. Example views of the hollow arm 104 with a top surface 110a, a bottom surface 110b and side surfaces 112a, 112b are shown in FIGS. 1 and 5. Each arm surface may be shaped as elongated rectangular plates.

As described above, the arm 104 may be flexibly connected with the mast 102 via the connection member 100. A hinged mast-arm connection enables the connection to withstand forces or loads that may be exerted on the connection. For example, the hinged mast-arm connection can efficiently withstand centrifugal forces when the turbine blades rotate (causing the rotation of the arms 104 and the mast 102), downward gravitation forces, loads due to wind turbulence, aerodynamics or rotating frame effects, and/or the like. The hinged mast-arm connection further ensures that the connection reduces the development of fractures or cracks with time, thus increasing longevity of mast-arm connection.

Figure 3:
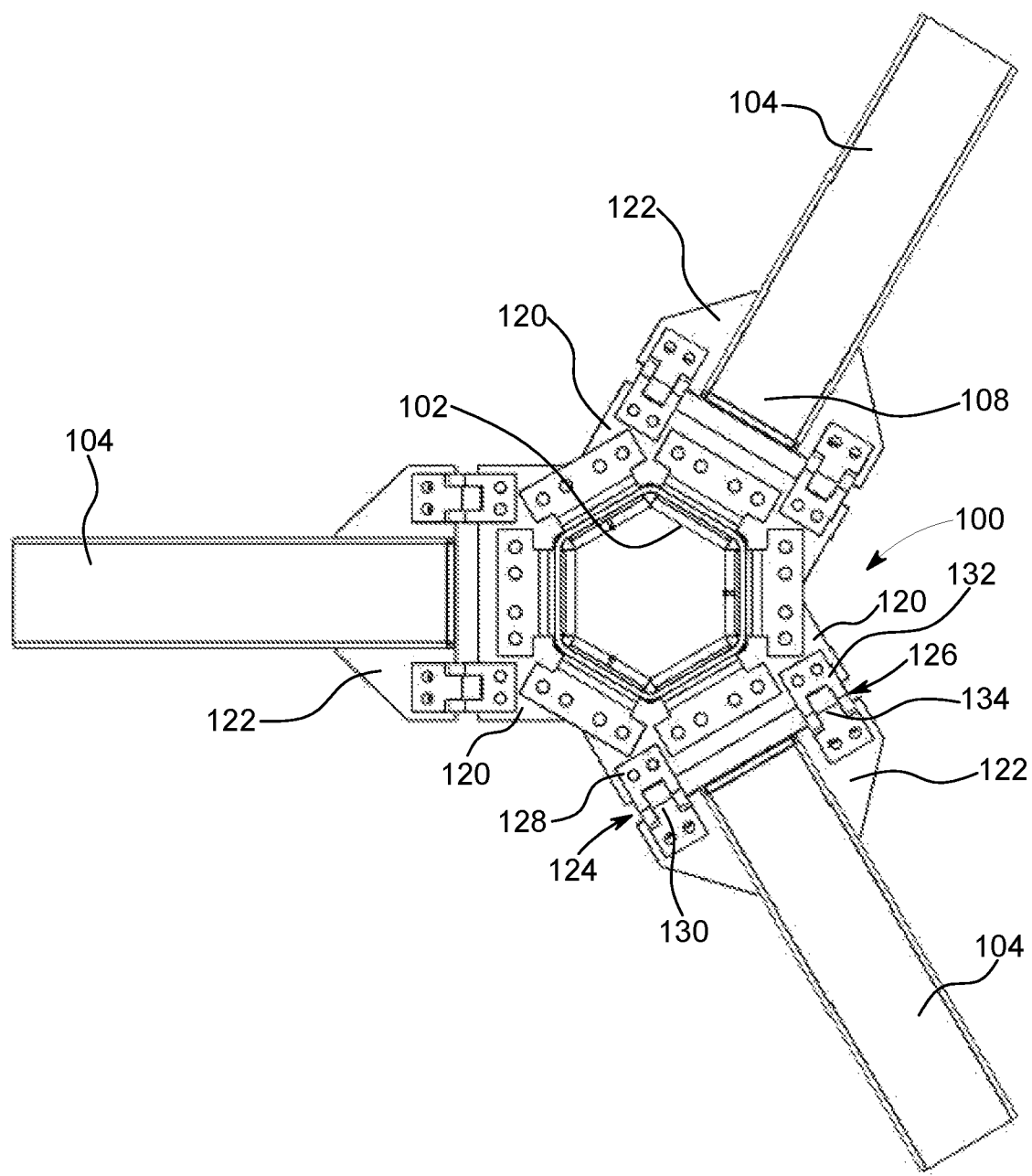
FIG. 3 depicts a top view of the connection member of FIG. 1 in accordance with the present disclosure.

The connection member 100 may include one or more L-shaped brackets 114 disposed on mast exterior surfaces. In an exemplary aspect, each mast exterior surface of the hexagonal mast 102 may be connected to an L-shaped bracket 114, as shown in FIGS. 1, 3 and 5. The L-shaped bracket 114 may be made of same material as the mast 102 or the arm 104. Each L-shaped bracket 114 may include a first portion 116 and a second portion 118. The second portion 118 may be disposed perpendicular to the first portion 116. Further, the first portion 116 and the second portion 118 may form a unitary structure of the L-shaped bracket 114. Dimensions of the first portion 116 and the second portion 118 may depend on mast and/or arm dimensions. In an exemplary aspect, a first portion width may be equivalent to width of each side of the hexagonal mast 102.

Each first portion 116 may be attached to the mast exterior surface via fasteners (e.g., bolts). As shown in FIGS. 1 and 5, a first portion plane may be parallel to a mast longitudinal axis. Further, the first portion 116 may be attached to the mast exterior surface such that the entire first portion area may touch the mast exterior surface.

Figure 2:
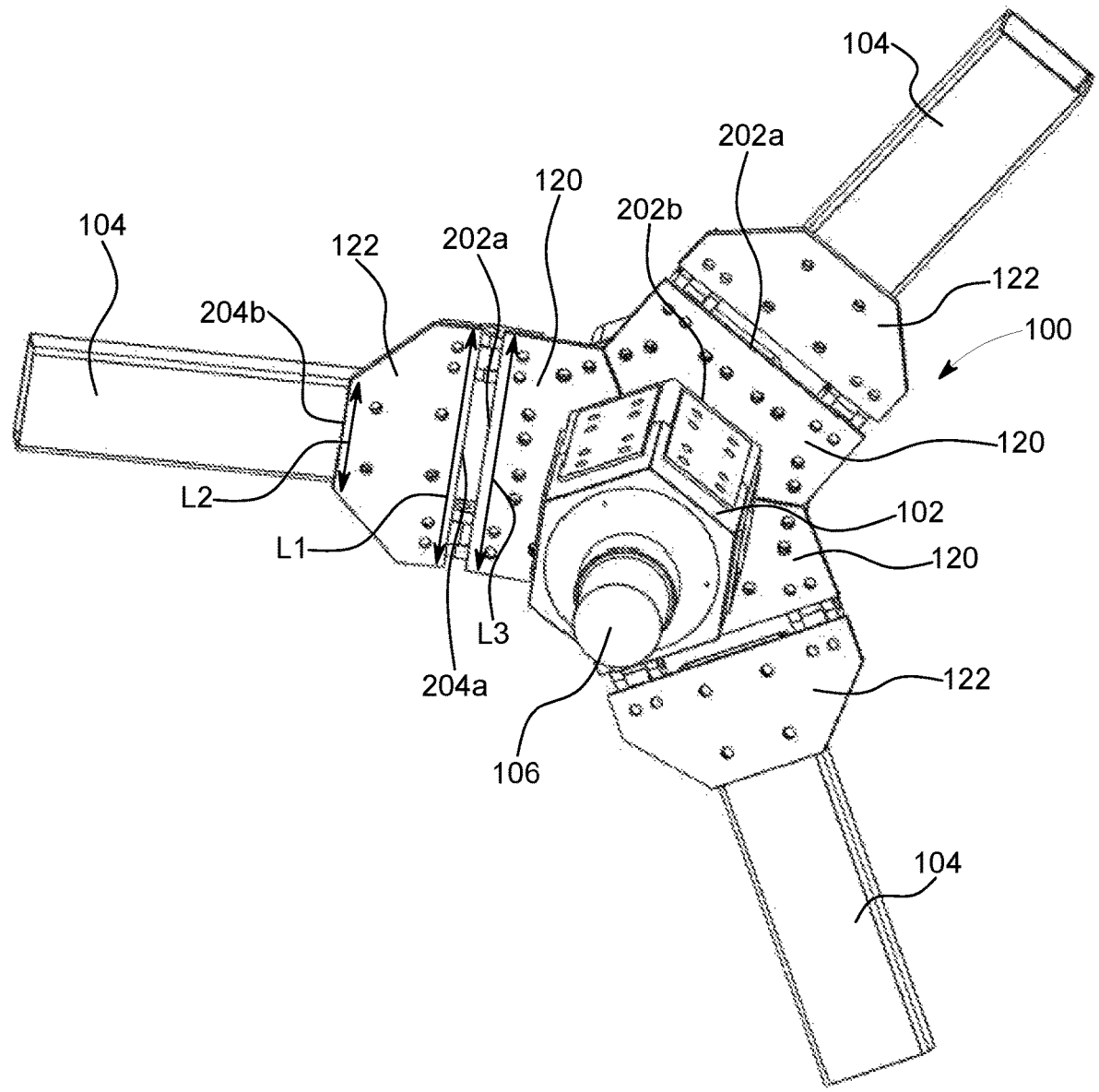
FIG. 2 depicts a bottom isometric view of the connection member of FIG. 1 in accordance with the present disclosure.
Figure 4:
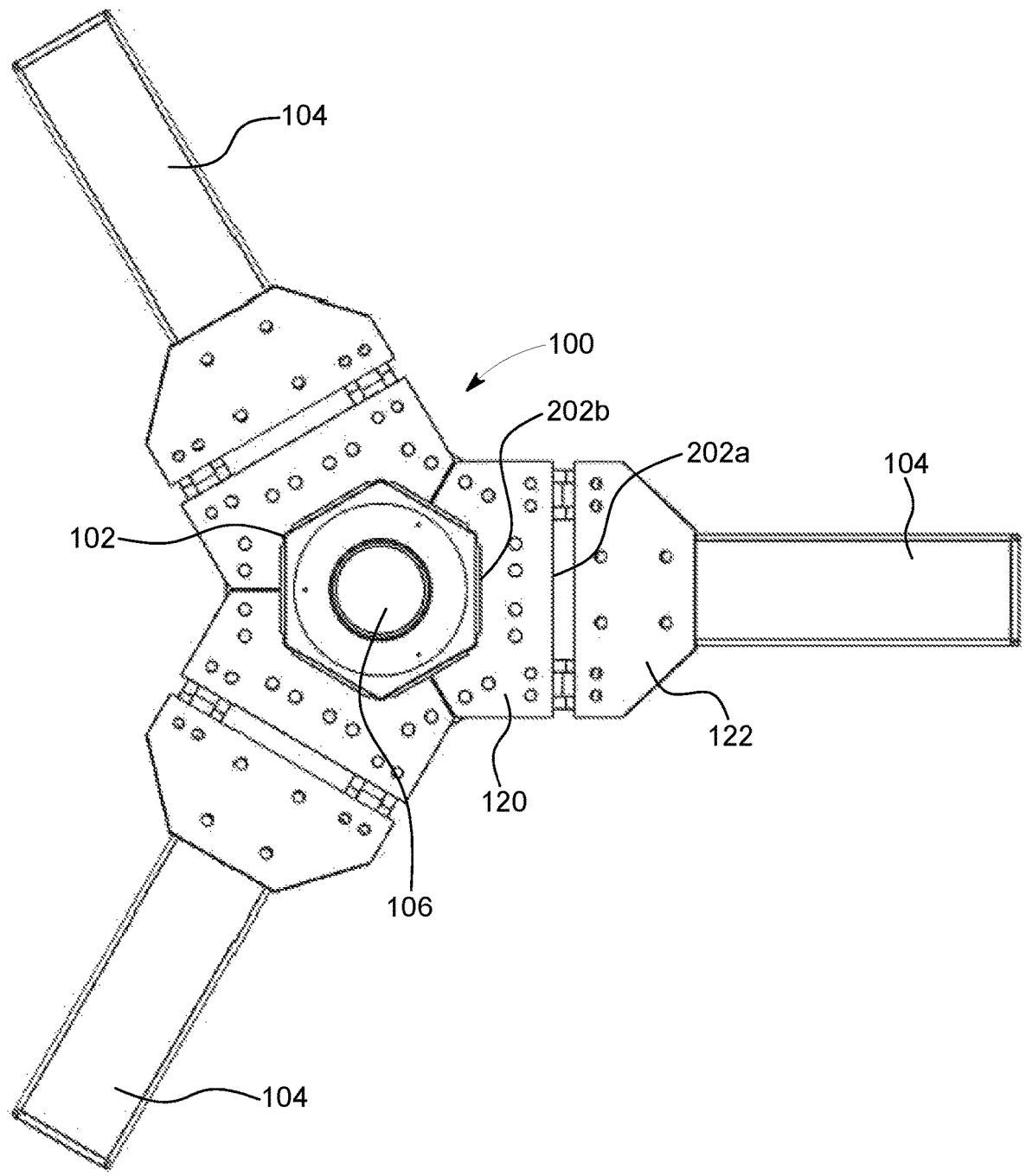
FIG. 4 depicts a bottom view of the connection member of FIG. 1 in accordance with the present disclosure.

The connection member 100 may further include one or more first plates 120 that may be attached to the second portion 118 via fasteners (e.g., bolts). The first plates 120 may be made of same or similar material as the mast 102 or the arm 104. In an exemplary aspect, when the mast 102 may be a hexagonal mast, three first plates 120 (e.g., "tri-plates" or "tri-ring") may be disposed around the mast circumference such that the first plates 120 cover the entire mast circumference, as shown in FIGS. 2 and 4. As shown in FIGS. 2 and 4, each first plate 120 may include a first edge 202a and a second edge 202b. The first edge 202a may be disposed away from the mast 102 and the second edge 202b may touch the mast exterior surface. The second edge 202b may be shaped to have two slanted edges and one flat edge disposed between the two slanted edges, such that the second edge 202b may seamlessly contact the mast exterior surface (with no gap between the mast exterior surface and the second edge 202b) when the first plate 120 may be attached to the second portion 118. In some aspects, the flat edge length may be equivalent to width of each mast side.

The first plate shape described above and shown in FIGS. 2 and 4 is for illustrative purpose only and should not be construed as limiting the present disclosure scope. A person ordinarily skilled in the art may appreciate that the first plate shape is dependent on mast cross-sectional shape and may change based on the mast shape. For example, the first plate shape may be different when the mast 102 may a cuboidal or pentagonal mast.

The first plate 120 may be attached to the second portion 118 such that a first plate plane may be disposed at a predefined angle relative to the mast longitudinal axis. In some aspects, the predefined angle may be 90 degrees. Stated another way, the first plate 120 may be attached to the second portion 118 such that the first plate 120 may be disposed perpendicular to the mast longitudinal axis.

The connection member 100 may additionally include one or more second plates 122 (or "hinge plates") that may be attached to the arm distal ends 108 via fasteners (e.g., bolts). Specifically, each second plate 122 may be bolted to the bottom surface 110b of the arm distal end 108 via a plurality of bolts (e.g., four or six bolts). A person ordinarily skilled in the art may appreciate that by bolting the second plate 122 to the bottom surface 110b (as opposed to both the bottom and top surfaces 110b, 110a), bending of arm distal end 108 due to the bolting operation may be eliminated. In some aspects, the second plate 122 may be attached to the arm distal end 108 such that a second plate plane may be parallel to an arm longitudinal axis.

The second plate 122 may be made of same material as the first plate 120. As shown in FIG. 2, the second plate 122 may include a distal edge 204a and a proximal edge 204b. The distal edge 204a may be disposed towards the mast 102 and away from the arm 104, and the proximal edge 204b may be disposed towards the arm 104 and away from the mast 102. A length "L1" of the distal edge 204a may be greater than a length "L2" of the proximal edge 204b. The length "L2" may be equivalent to an arm width. Further, the length "L1" may be equivalent to a length "L3" of the first edge 202a.

The connection member 100 may further include a first pivot connector 124 and a second pivot connector 126, as shown in FIGS. 1 and 3. The first pivot connector 124 and the second pivot connector 126 may be disposed on opposite sides of the arm distal end 108. Stated another way, the arm distal end 108 may be disposed between the first pivot connector 124 and the second pivot connector 126. The first pivot connector 124 and the second pivot connector 126 may pivotally connect the first plate 120 and the second plate 122, thus pivotally or flexibly connecting the mast 102 and the arm 104 as described below.

The first pivot connector 124 may include a first yoke 128 and a first hinge 130, and the second pivot connector 26 may include a second yoke 132 and a second hinge 134, as shown in FIGS. 1 and 3. The first yoke 128 may be pivotally connected with the first hinge 130 via a pivotal pin (e.g., a first pivotal pin, not shown). Similarly, the second yoke 132 may be pivotally connected with the second hinge 134 via another pivotal pin (e.g., a second pivotal pin, not shown).

The first yoke 128 and the second yoke 132 may be attached to the first plate 120 via fastening means (e.g., bolts), and the first hinge 130 and the second hinge 134 may be attached to the second plate 122 via fastening means (e.g., bolts). Since the first and second yokes 128, 132 are pivotally connected to the first and second hinges 130, 134 respectively, connection of the first and second plates 120, 122 to respective yokes and hinges makes the first and second plates 120, 122 pivotally connected with each other. Furthermore, since the first plate 120 is connected to the mast 102 (via the L-shaped bracket 114) and the second plate 122 is connected to the arm 104, pivotal connection of the first and second plates 120, 122 enables the arm 104 to pivotally connect with the mast 102. In this manner, the present disclosure enables a hinged mast-arm connection.

Components of the first and second pivot connectors 124, 126 may be made of metal, e.g., iron, steel, aluminum, a combination thereof, and/or the like. Further, the first and second pivot connectors 124, 126 may have sizes that may depend on mast and/or arm sizes.

The connection member 100, as proposed in the present disclosure, provides various advantages over conventional mast-arm connection. For example, having two pivot connectors (e.g., the first pivot connector 124 and the second pivot connector 126) connected on either sides of the arm distal end 108 ensures that the loads experienced by the connection member 100 are equally distributed between the two pivot connectors, thus enabling the connection member to withstand greater loads as compared to a conventional mast-arm connection. Further, the connection member 100 pivotally and flexibly connects the mast 102 with the arm 104, thus ensuring that the mast-arm connection does not develop fractures or bends when the connection member 100 experiences loads.

Furthermore, as apparent from FIGS. 1 and 3, the L-shaped brackets 114 are attached to each mast surface (even the surfaces where the arms 104 may not be attached). By having the L-shaped brackets 114 attached to each mast surface, the loads experienced by the hinges (e.g., the first and second hinges 130, 134), which gets transferred to the first plates 120, are equally distributed to all mast surfaces and are not confined to mast surfaces that have the arms 104 attached to them. Specifically, since all the L-shaped brackets 114 are attached to the three first plates 120, the loads or forces that are transferred to the first plates 120 from the hinges are equally distributed to all mast surfaces. In this manner, the mast-arm connection becomes more stable and can withstand greater loads, as the loads are equally distributed across all mast surfaces.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A connection member to connect a mast with an arm, the connection member comprising:
   an L-shaped bracket having a first portion and a second portion disposed perpendicular to the first portion, wherein the first portion is attached to a mast exterior surface;
   a first plate attached to the second portion, wherein a first plate plane is disposed at a predefined angle relative to a mast longitudinal axis;
   a second plate attached to an arm distal end, wherein a second plate plane is disposed parallel to an arm longitudinal axis; and
   a first pivot connector pivotally connecting the first plate and the second plate,
   wherein the mast and the arm are part of a vertical axis wind turbine.

2. The connection member of claim 1, wherein the predefined angle is 90 degrees.

3. The connection member of claim 1, wherein the first pivot connector comprises a first yoke and a first hinge, wherein the first yoke is pivotally connected with the first hinge, and wherein the first yoke is attached to the first plate and the first hinge is attached to the second plate.

4. The connection member of claim 3 further comprising a second pivot connector having a second yoke and a second hinge, wherein the second yoke is pivotally connected with the second hinge, and wherein the second yoke is attached to the first plate and the second hinge is attached to the second plate.

5. The connection member of claim 4, wherein the arm distal end is disposed between the first pivot connector and the second pivot connector.

6. The connection member of claim 4 further comprising a first pivotal pin and a second pivotal pin, wherein the first yoke is pivotally connected with the first hinge via the first pivotal pin, and wherein the second yoke is pivotally connected with the second hinge via the second pivotal pin.

7. The connection member of claim 1, wherein the mast is a polygonal mast.

8. The connection member of claim 7, wherein the mast is a hexagonal mast.

9. The connection member of claim 1, wherein an arm proximal end is attached to a blade of the vertical axis wind turbine.

10. The connection member of claim 1, wherein a first portion plane is disposed parallel to the mast longitudinal axis.

11. The connection member of claim 1, wherein the first portion and the second portion form a unitary structure of the L-shaped bracket.

12. A connection member to connect a mast with an arm, the connection member comprising:
    an L-shaped bracket having a first portion and a second portion disposed perpendicular to the first portion, wherein the first portion is attached to a mast exterior surface;
    a first plate attached to the second portion, wherein a first plate plane is disposed perpendicular to a mast longitudinal axis;
    a second plate attached to an arm distal end, wherein a second plate plane is disposed parallel to an arm longitudinal axis; and
    a first pivot connector and a second pivot connector pivotally connecting the first plate and the second plate, wherein the arm distal end is disposed between the first pivot connector and the second pivot connector.

13. The connection member of claim 12, wherein the mast is a polygonal mast.

14. The connection member of claim 13, wherein the mast is a hexagonal mast.

15. The connection member of claim 12, wherein the mast and the arm are part of a vertical axis wind turbine.

16. The connection member of claim 15, wherein an arm proximal end is attached to a blade of the vertical axis wind turbine.

17. The connection member of claim 12, wherein a first portion plane is disposed parallel to the mast longitudinal axis.

18. The connection member of claim 12, wherein the first portion and the second portion form a unitary structure of the L-shaped bracket.

19. A vertical axis wind turbine comprising:
    a polygonal mast;
    an arm having an arm proximal end and an arm distal end;
    an L-shaped bracket having a first portion and a second portion disposed perpendicular to the first portion, wherein the first portion is attached to a polygonal mast exterior surface;
    a first plate attached to the second portion, wherein a first plate plane is disposed perpendicular to a polygonal mast longitudinal axis;
    a second plate attached to the arm distal end, wherein a second plate plane is disposed parallel to an arm longitudinal axis; and
    a pivot connector pivotally connecting the first plate and the second plate.

* * * * *